US008151688B2

(12) United States Patent
Saotome et al.

(10) Patent No.: US 8,151,688 B2
(45) Date of Patent: Apr. 10, 2012

(54) HYDRAULIC CIRCUIT OF CONSTRUCTION MACHINE

(75) Inventors: Yoshimi Saotome, Hiroshima (JP); Norifumi Shiraga, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 686 days.

(21) Appl. No.: 12/339,813

(22) Filed: Dec. 19, 2008

(65) Prior Publication Data

US 2009/0205723 A1 Aug. 20, 2009

(30) Foreign Application Priority Data

Feb. 19, 2008 (JP) ................................ 2008-037280

(51) Int. Cl.
*F15B 13/042* (2006.01)
*F16D 31/02* (2006.01)

(52) U.S. Cl. ........................................... 91/461; 60/494

(58) Field of Classification Search .................... 60/468, 60/494; 91/461
See application file for complete search history.

(56) References Cited

U.S. PATENT DOCUMENTS 7,634,961 B2 * 12/2009 Asakage et al. ................ 91/461
2007/0277883 A1 12/2007 Asakage et al.

FOREIGN PATENT DOCUMENTS

JP 2001-208005 8/2001
JP 2006-125627 5/2006
WO WO 2006035648 A1 * 4/2006

* cited by examiner

*Primary Examiner* — Michael Leslie
(74) *Attorney, Agent, or Firm* — Oblon, Spivak, McClelland, Maier & Neustadt, L.L.P.

(57) ABSTRACT

A throttle path for returning a part of pilot oil to a tank is formed by a tank path provided in a valve block of a control valve and a notch provided in a spool thereof. The above path is opened within a section from a vicinity of a stroke where a hydraulic actuator starts moving to right before a stroke end among a spool stroke of the control valve. An opening area of the above path is slowly reduced in accordance with an increase in the stroke at a final phase of the section.

4 Claims, 4 Drawing Sheets

HYDRAULIC CIRCUIT OF CONSTRUCTION MACHINE

BACKGROUND OF THE INVENTION

1. Field of the Invention

The present invention relates to a hydraulic circuit for preventing a sudden movement of an actuator due to a rapid change in pilot pressure at the time of a rapid operation in a construction machine operating a control valve by the pilot pressure from a remote control valve and actuating a hydraulic actuator.

2. Description of Related Art

This type of a hydraulic circuit of a construction machine will be shown in FIG. 6.

In the figure, the reference numeral 1 denotes a hydraulic actuator (a hydraulic motor is shown as an example). The reference numeral 2 denotes a main pump serving as a hydraulic source. The reference numeral 3 denotes a control valve of a hydraulic pilot type for controlling an action of the hydraulic actuator 1. The reference numerals 4 and 5 denote pilot ports on the both sides of this control valve 3.

The reference numeral 6 denotes a remote control valve for operating the control valve 3. The remote control valve is formed by a pair of pressure reducing valves 7 and 8 and a lever 9 for operating the pressure reducing valves. Secondary sides of both the pressure reducing valves 7 and 8 are connected to the pilot ports 4 and 5 on the both sides of the control valve 3 through pilot tubes 10 and 11 respectively.

Pilot lines 12 and 13 for transmitting pilot pressure generated in the pressure reducing valves 7 and 8 to the control valve 3 via the pilot tubes 10 and 11 (pilot lines 12 and 13 indicating the whole pilot pressure supplying system including the pressure reducing valves 7 and 8, the pilot tubes 10 and 11, and the control valve 3) are formed. By these pilot lines 12 and 13, the control valve 3 performs a stroke action in accordance with a lever operation amount of the remote control valve 6 so that an action of the hydraulic actuator 1 is controlled.

In the figure, the reference numeral 14 denotes a pilot pump serving as the pilot hydraulic source, and T denotes a tank.

When the remote control valve 6 is rapidly operated in this hydraulic circuit, the pilot pressure transmitted to the control valve 3 by the pilot lines 12 and 13 is rapidly changed and the control valve 3 is rapidly actuated. Therefore, the hydraulic actuator 1 moves suddenly so that there is a problem of shock occurrence.

As techniques corresponding to this problem, Japanese Patent Laid-Open Nos. 2006-125627 and 2001-208005 are already known.

In the above techniques, throttle paths (a bleed-off path having a throttle, FIG. 6 shows an example of a throttle path diverged from the pilot tubes 10 and 11) 15 communicating with tanks T are provided in the pilot lines 12 and 13 (the pilot tubes 10 and 11 or a spool of the control valve 3, or the pressure reducing valves 7 and 8). By these throttle paths 15, a part of pilot oil is returned to the tanks while being throttled so as to exercise a buffering function of easing a change in the pilot pressure and preventing a sudden movement of the hydraulic actuator 1.

However, in both the techniques, since the throttle paths 15 are constantly opened over the entire spool stroke of the control valve 3, a leakage amount (a bleed-off amount) of the pilot oil is increased. Therefore, an opening area of the throttle path 15 is limited to be small so as to decrease this leakage amount as much as possible. Consequently, there is a disadvantage that a sufficient buffering effect is not easily obtained relative to an actuator action at the time of a rapid operation.

In consideration of not only a pressure decrease in the pilot lines 12 and 13 but also the leakage amount from the throttle path, the pilot pressure should be set to be high so that the spool of the control valve 3 surely reaches a stroke end at the time of a full operation. As a result, the spool reaches the stroke end before the lever 9 of the remote control valve reaches the maximum operation amount. Therefore, the lever operation amount is in excess so that there is a disadvantage of deteriorating operability.

SUMMARY OF THE INVENTION

It is an object of the present invention to provide a hydraulic circuit of a construction machine capable of ensuring a buffering function at the time of a rapid operation while suppressing a leakage amount of pilot oil.

The present invention is a hydraulic circuit of a construction machine, comprising a remote control valve, a control valve of a hydraulic pilot type with a spool for performing a stroke action by pilot pressure from the remote control valve, a hydraulic actuator whose action is controlled by the control valve, and a throttle path for returning a part of pilot oil to a tank while throttling, the throttle path being provided in a pilot line for transmitting the pilot pressure from the remote control valve to the control valve, wherein the throttle path is adapted to be opened from a vicinity of a stroke where the hydraulic actuator starts moving among a spool stroke of the control valve.

In the present invention, the throttle path is not constantly opened over the entire spool stroke of the control valve but opened from the vicinity of the stroke where the hydraulic actuator actually starts moving after the spool starts performing the stroke action. Therefore, it is possible to decrease the leakage amount of the pilot oil from the throttle path.

By this decrease in the leakage amount, the opening area of the throttle path can be extended and the buffering function can be ensured at the time of starting up the actuator where shock is most frequently occurred due to the rapid operation. Therefore, it is possible to obtain a necessary and sufficient buffering effect.

Since the leakage amount is decreased, the pilot pressure can be set to be low in comparison to Related Art. Therefore, there is no fear that the spool early reaches a stroke end so that a useless lever stroke is occurred, and it is possible to improve operability.

Here, the leakage amount from the throttle path is increased in accordance with the pilot pressure applied to the control valve (a lever operation amount of the remote control valve=the spool stroke) and becomes the maximum at the stroke end.

In the above configuration, the throttle path is preferably adapted to be closed before the spool of the control valve reaches the stroke end.

In this case, since the throttle path is adapted to be closed before the spool of the control valve reaches the stroke end (before the leakage amount becomes the maximum), it is possible to further suppress the leakage amount.

Further, in any of the above configurations, an opening area of the throttle path is preferably adapted to be reduced in accordance with an increase in the spool stroke.

In this case, since the opening area of the throttle path is adapted to be reduced in accordance with the increase in the spool stroke, it is possible to further decrease the leakage amount.

The throttle path may be provided in the outside of the control valve or the inside thereof.

Here, in the case where the throttle path of the control valve is formed by providing a notch in the spool of the control valve and a tank path communicating with the tank in a valve block thereof, there are advantages of reducing cost and saving space for the buffering function in comparison to a case where the throttle path is provided in the outside of the valve due to the facts that:

(α) there is no need for a piping; and (β) there is only need for additionally processing the notch in the spool but no need for means for linking movement of the spool and the opening area of the throttle path.

Further, since the throttle path is formed by the notch and the tank path of the control valve, this throttle path also functions as an air-bleeding path for bleeding the air from a pilot port to the tank. This contributes to easier processing of the spool and cost reduction.

DETAILED DESCRIPTION OF THE PREFERRED EMBODIMENTS

A description will be given to an embodiment of the present invention with reference to FIGS. 1 to 5.

Figure 1:
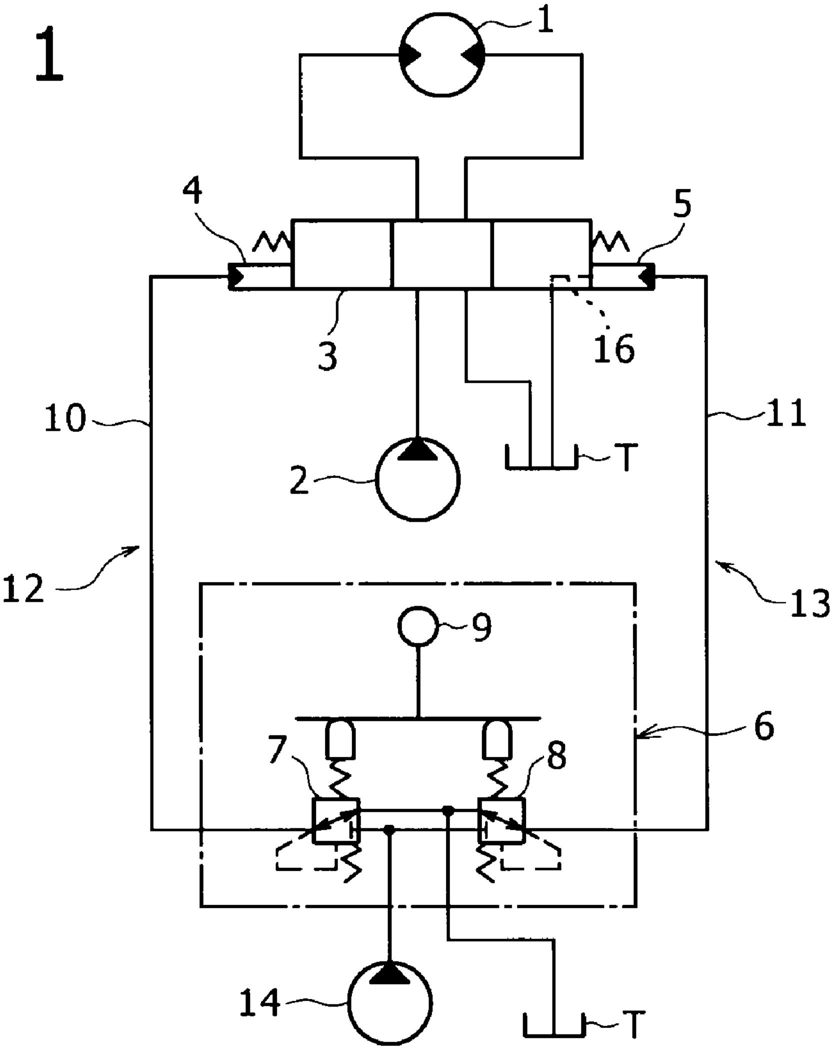
FIG. 1 is a diagram of a hydraulic circuit according to an embodiment of the present invention.
Figure 6:
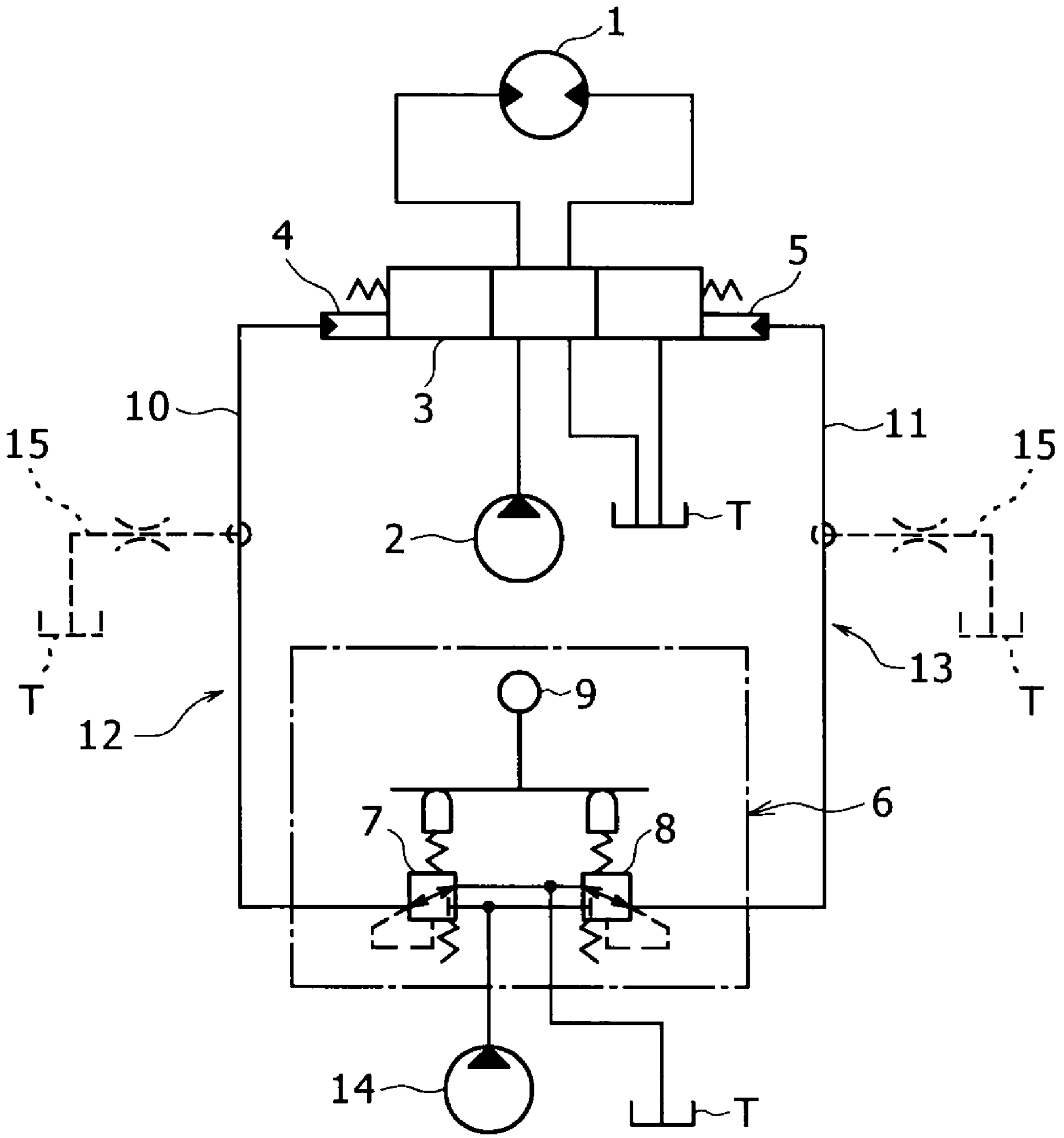
FIG. 6 is a diagram of a hydraulic circuit of Related Art.

FIG. 1 shows a hydraulic circuit according to the embodiment. A basic configuration of this hydraulic circuit is the same as a basic configuration of a hydraulic circuit of Related Art shown in FIG. 6. Therefore, parts in FIG. 1 which are the same as in FIG. 6 are given the same reference numerals and a duplicated description thereof will be omitted.

In the present embodiment, a throttle path 16 communicating with a tank T is provided in the inside of a control valve 3. This throttle path 16 is opened from a vicinity of a spool stroke where a hydraulic actuator 1 starts moving. That is, this throttle path 16 is opened from the vicinity of predetermined pilot pressure by which the hydraulic actuator 1 starts moving.

A detailed description will be given to this point with reference to FIG. 2.

Figure 2:
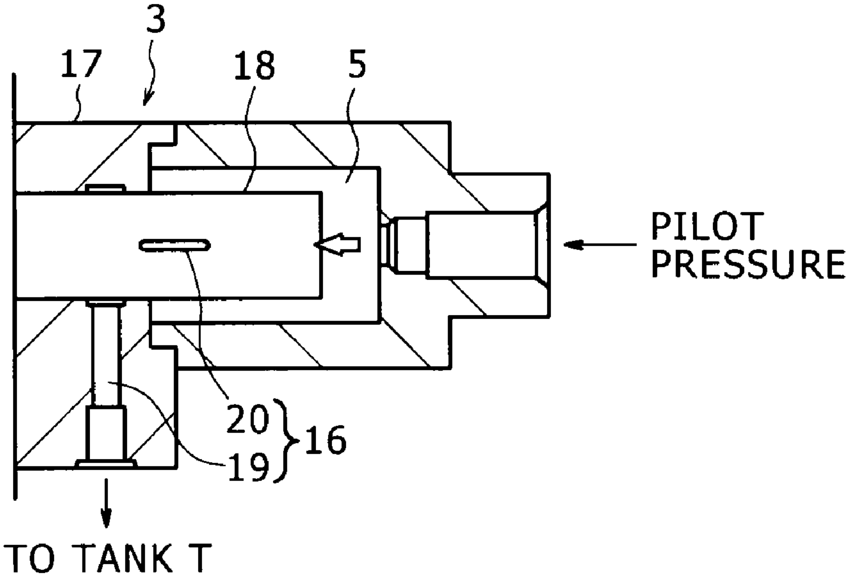
FIG. 2 is a sectional view of a pilot portion in the embodiment.

Although FIG. 2 shows a structure of a right pilot portion of the control valve 3 in FIG. 1 as an example, the other side has the same configuration.

In the figure, the reference numeral 17 denotes a valve block serving as a main body of the control valve 3, and the reference numeral 18 denotes a spool. This spool 18 performs a stroke action by pilot pressure applied to a pilot port 5.

A tank path 19 communicating with the tank T is provided in the valve block 17, and a notch 20 communicating with this tank path 19 at a predetermined stroke is provided in the spool 18. The throttle path 16 is formed by these units.

Figure 3:
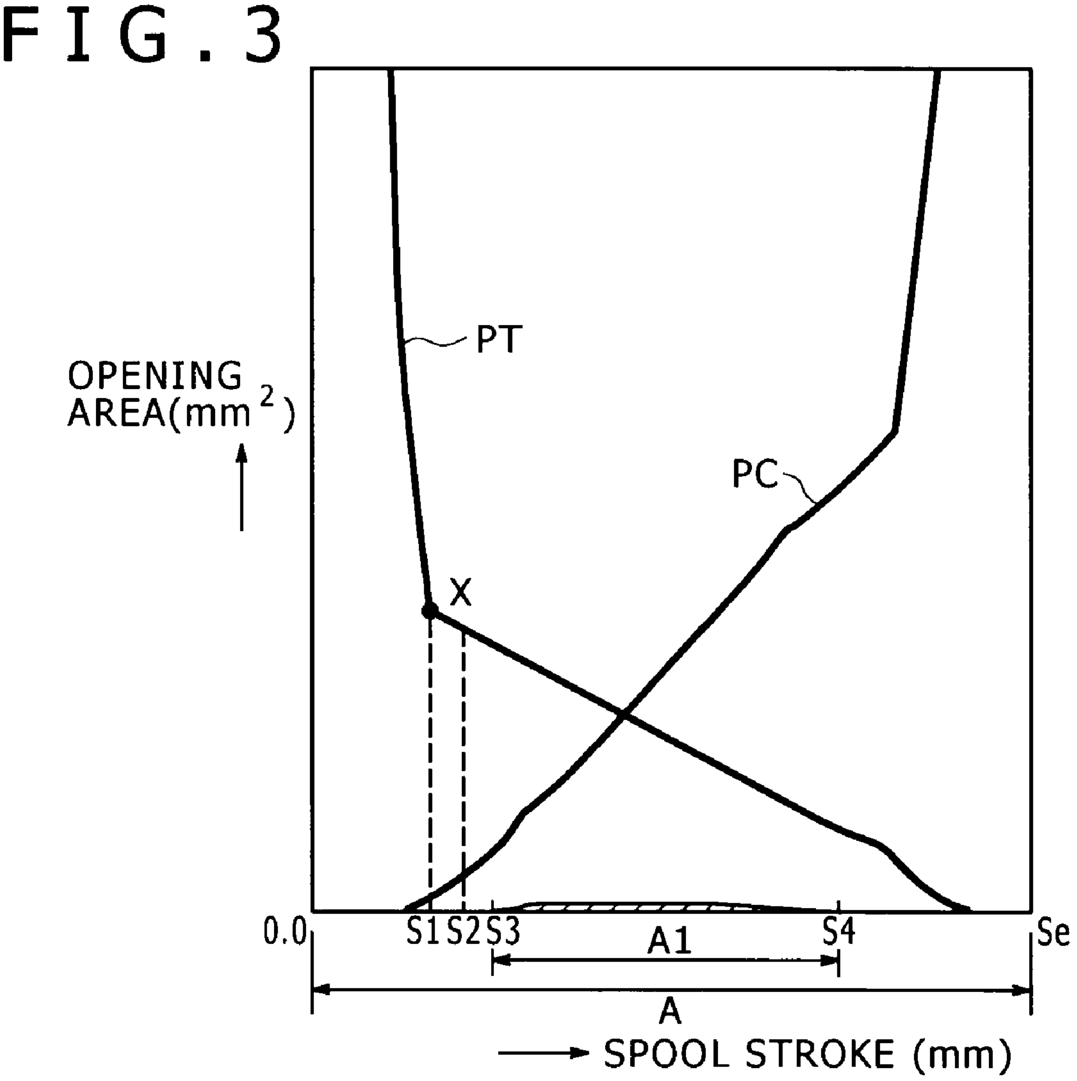
FIG. 3 is a graph showing a relationship between a spool stroke of a control valve according to the embodiment and opening areas of paths.
Figure 4:
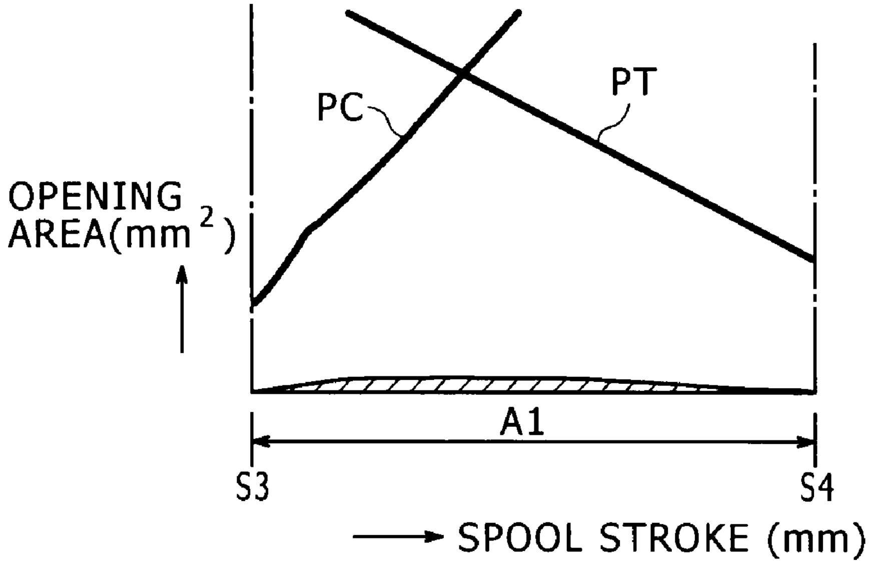
FIG. 4 is a graph enlarging and showing a part of FIG. 3.

A description will be give to a relationship between the stroke of the spool 18 and an opening area of the throttle path 16 with reference to FIGS. 3 and 4.

In both the figures, a horizontal axis indicates the spool stroke (=the pilot pressure), and a vertical axis indicates opening areas of a bleed-off path (a path for bleed-off control) PT of the control valve 3, a meter-in path PC and the throttle path 16. The figures show a change state of these opening areas in accordance with the spool stroke.

It should be noted that an opening part of the throttle path 16 (a part where the notch 20 communicates with the tank path 19) is shown by diagonal lines for easy distinction. Although the figures only show the relationship between the stroke and the opening areas of an action on one side, the other side has the same relationship.

The spool 18 of FIG. 2 starts performing the stroke action to the left side in accordance with an operation of the remote control valve 6 of FIG. 1. While the bleed-off path PT is gradually closed according to an increase in this spool stroke, the meter-in path PC is gradually opened.

Here, the opening area of the bleed-off path PT (a bleed-off flow rate) is rapidly reduced from start of the stroke to a stroke S1 and slowly reduced with a gentle inclination after creating a flection point X as shown in the figure.

Meanwhile, the opening area of the meter-in path PC (a meter-in flow rate) is conversely increased in accordance with the increase in the stroke. Therefore, the hydraulic actuator 1 starts moving at a stroke S2 slightly after the stroke S1 of the flection point X.

The throttle path 16 starts to be opened at a stroke S3 in the vicinity of the stroke S2 where this hydraulic actuator 1 starts moving (although FIG. 3 shows that S3 is slightly after S2, S3 may be the same as or slightly before S2), and is closed at a stroke S4 right before a stroke end Se.

That is, the throttle path 16 is opened only within a section A1 from start of movement of the hydraulic actuator 1 to right before the stroke end among the entire spool stroke A. A part of pilot oil is dropped to the tank T through this throttle path 16. Thereby, shock at the time of a rapid operation, that is, a rapid action of the control valve 3 due to a rapid rise in the pilot pressure and a sudden movement of the hydraulic actuator 1 due to the rapid action are prevented.

According to this configuration, since the throttle path 16 is only opened within the section A1 serving as a part of the entire spool stroke A, it is possible to decrease an amount of the pilot oil (a leakage amount) escaping from this throttle path 16 to the tank T.

It is possible to obtain a necessary and sufficient buffering effect due to the facts that:

(α) by this decrease in the leakage amount, the opening area of the throttle path 16 can be extended; and (β) since the throttle path 16 is opened in accordance with the start of the movement of the actuator where the shock is most frequently occurred due to the rapid operation, a buffering function can be ensured at the time of starting up.

Since the leakage amount is decreased, the pilot pressure can be set to be low in comparison to Related Art. Therefore, there is no fear that the spool early reaches the stroke end so that a useless lever stroke is occurred, and it is possible to improve operability.

According to this embodiment, it is possible to obtain the following effects.

(i) The leakage amount from the throttle path 16 is increased in accordance with the pilot pressure applied to the control valve 3 (a lever operation amount of the remote control valve 6=the spool stroke) and becomes the maximum at the stroke end.

In this embodiment, the opening area of the throttle path 16 is slowly reduced in accordance with the increase in the stroke at a final phase of the section A1 of opening the throttle path 16 as shown in FIG. 4.

Thereby, it is possible to suppress the leakage amount at the final phase of the stroke and further reduce the leakage amount of the pilot oil throughout the entire spool stroke.

It should be noted that such a characteristic can be easily obtained by ways of making a tip of the notch 20 of the spool 18 shown in FIG. 2 shrinking or shallowing or the like.

(ii) Since the throttle path 16 is formed by providing the notch 20 in the spool 18 of the control valve 3 and the tank path 19 in the valve block 17 thereof, it is possible to reduce cost and save space for the buffering function in comparison to a case where the throttle path is provided in the outside of the control valve 3 due to the facts that:

(α) there is no need for a piping; and (β) there is only need for additionally processing the notch 20 in the spool 18 but no need for means for linking movement of the spool 18 and opening and closing of the throttle path 16.

Further, since the throttle path 16 is formed in the control valve 3 by the notch 20 and the tank path 19, this throttle path 16 also functions as an air-bleeding path for bleeding the air from the pilot port 5 to the tank. This contributes to easier processing of the spool and cost reduction.

Figure 5:
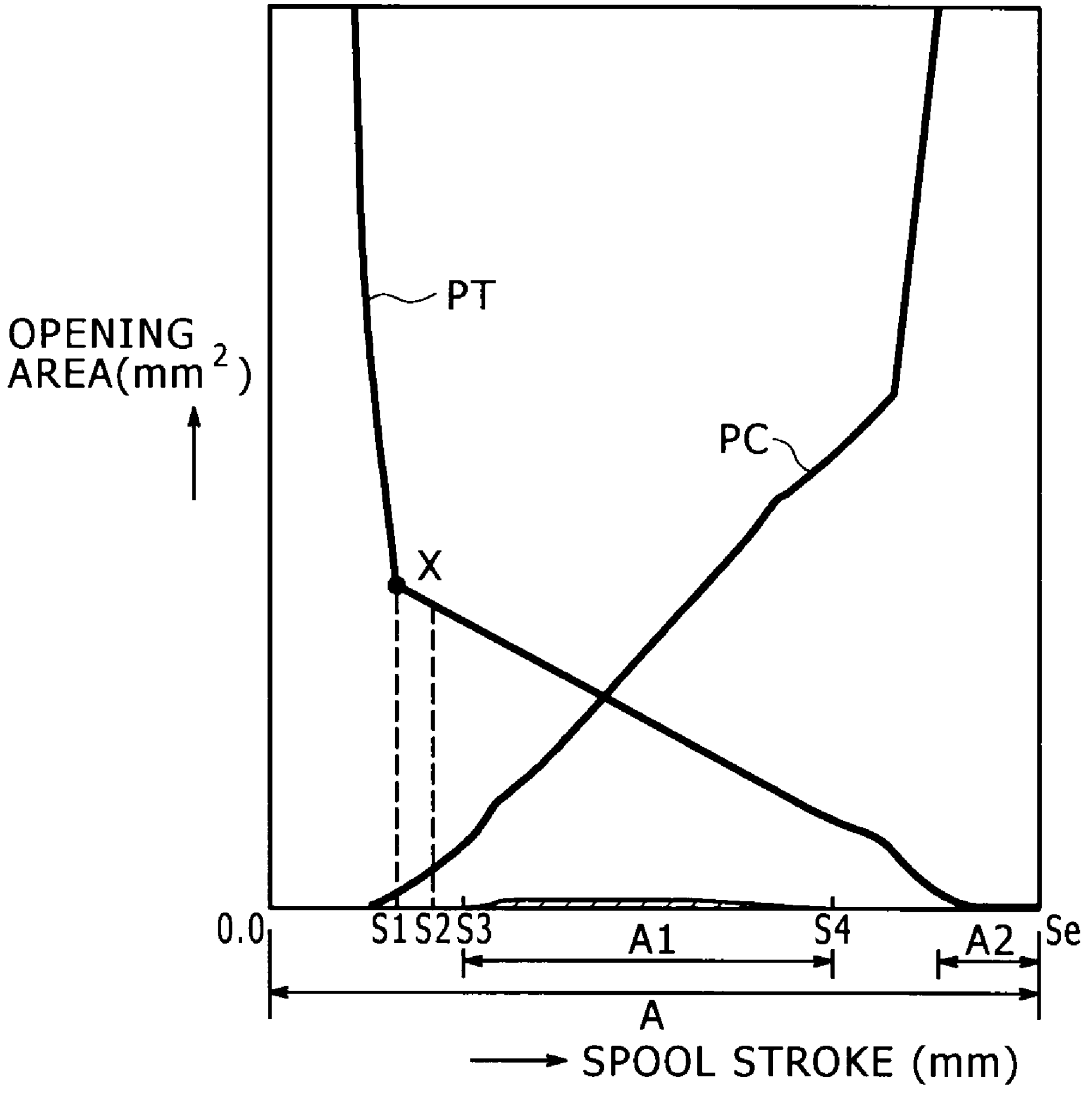
FIG. 5 is a graph showing another embodiment of the present invention and corresponding to FIG. 3.

OTHER EMBODIMENTS (1) Separately from the throttle path 16, an exclusive path for air-bleeding communicating with the tank T within a section A2 from the final phase of the stroke to the stroke end Se may be provided as shown in FIG. 5. The exclusive path can be formed by providing a notch other than the notch 20 for the throttle path of FIG. 2 so as to communicate with the tank path 19 within the section A2.

In such a way, it is possible to obtain an air-bleeding function not only within the section A1 of opening the throttle path 16 but also in a state of full-lever operation. Therefore, there is no need for labor of once returning the lever 9 of the remote control valve 6 to a neutral position after a full stroke and then placing the lever 9 again unlike a case where the air-bleeding is performed by only the throttle path 16.

(2) In the above embodiment, the opening area of the throttle path 16 is slowly reduced in accordance with the increase in the stroke only at the final phase of the section A1 of opening the throttle path 16. However, the opening area may be slowly reduced from a time point when the opening area of the throttle path 16 becomes the maximum to the closing of the throttle path 16.

(3) The throttle path 16 may be provided in the outside of the control valve 3 and opening control may be performed while linking with the stroke of the control valve 3. Specifically, for example, a tank path having a variable throttle is diverged from pilot tubes 10 and 11 and an opening area of the variable throttle can be controlled by a controller in accordance with the spool stroke of the control valve 3.

Although the invention has been described with reference to the preferred embodiments in the attached figures, it is noted that equivalents may be employed and substitutions made herein without departing from the scope of the invention as recited in the claims.

The invention claimed is:

1. A hydraulic circuit of a construction machine, comprising:

a remote control valve;

a control valve of a hydraulic pilot type with a spool for performing a stroke action by pilot pressure from said remote control valve;

a hydraulic actuator whose action is controlled by said control valve; and a throttle path for returning a part of pilot oil to a tank while throttling, said throttle path being provided in a pilot line for transmitting the pilot pressure from said remote control valve to said control valve, wherein said throttle path has a variable opening area and is adapted to be closed when said spool stroke of said control valve is less than a specified stroke and to be opened from a point when said spool stroke reaches said specified stroke, said specified stroke being from a vicinity of a stroke where said hydraulic actuator starts moving.

2. The hydraulic circuit of the construction machine according to claim 1, wherein said throttle path is adapted to be closed before the spool of said control valve reaches a stroke end.

3. The hydraulic circuit of the construction machine according to claim 1, wherein said opening area of said throttle path is adapted to be reduced in accordance with an increase in the spool stroke.

4. The hydraulic circuit of the construction machine according to claim 1, wherein said throttle path of said control valve is formed by providing a notch in the spool of said control valve and a tank path communicating with the tank in a valve block thereof.

* * * * *